US005969353A

United States Patent [19]

Hsieh

[11] Patent Number: 5,969,353

[45] Date of Patent: Oct. 19, 1999

[54] MICROFLUID CHIP MASS SPECTROMETER INTERFACE

[75] Inventor: Yinliang F. Hsieh, Lexington, Mass.

[73] Assignee: Millennium Pharmaceuticals, Inc., Cambridge, Mass.

[21] Appl. No.: 09/010,942

[22] Filed: Jan. 22, 1998

[51] Int. Cl.[6] ............................ H01J 49/04; G01N 27/26

[52] U.S. Cl. ........................... 250/288; 250/281; 239/690

[58] Field of Search .................................... 250/288, 281; 239/690, 708

[56] References Cited

U.S. PATENT DOCUMENTS 5,788,166 8/1998 Valaskovic et al. .................... 239/708

OTHER PUBLICATIONS

Xue et al., Multichannel Microchip Electrospray Mass Spectrometry, Analytical Chemistry, V 69, N 3, Feb. 1, 1997.

Ramsey et al., Generating Electrospray from Microchip Devices Using Electroosmotic Pumping, Analytical Chemistry, V. 6, N. 6, Mar. 15, 1997.

*Primary Examiner*—Edward P. Westin
*Assistant Examiner*—Nikita Wells
*Attorney, Agent, or Firm*—Fish & Richardson, P.C.

[57] ABSTRACT

The invention features an improved interface between a microfluid chip and a mass spectrometer. It has been found that by connecting a very fine tube (or "interface tip") to an outlet port of a microfluid chip, the sensitivity of the mass spectroscopy analysis of materials exiting the outlet port of a microfluid chip is greatly enhanced.

18 Claims, 2 Drawing Sheets

MICROFLUID CHIP MASS SPECTROMETER INTERFACE

BACKGROUND OF THE INVENTION

The desirability of conducting high throughput analysis of very small samples, e.g., biological samples, has led to the development of microfluid chip devices. These devices, constructed using techniques such as photolithography, wet chemical etching, and thin film deposition, that are commonly used in the production of electronic chips, allow one to perform separation and analysis of samples as small as a few picoliters or less. Sophisticated microfluid chip devices enable precise mixing, separation, and reaction of samples in a integrated system. Generally, microfluid chip have a number of micrometer width channels connecting various reservoirs. Materials are manipulated through the channels and reservoirs using electrokinetic forces or other means.

Microfluid chips have been interfaced to electrospray ionization mass spectrometers (Xue et al., *Anal. Chem.* 69:426, 1997; Ramsey and Ramsey, *Anal. Chem.* 69:1174, 1997).

Electrospray ionization is used to produce ions for mass spectrometry analysis from large, complex molecules, for example, proteins and nucleic acid molecules. In electrospray ionization, a sample solution enters an electrospray chamber through a hollow needle which is maintained at a few kilovolts relative to the walls of the electrospray chamber. The electrical field charges the surface of the liquid emerging from the needle, dispersing it by Coulomb forces into a spray of fine, charged droplets. At this point the droplets become unstable and break into daughter droplets. This process is repeated as solvent continues to evaporate from each daughter droplet. Eventually, the droplets become small enough for the surface charge density to desorb ions from the droplets into the abient gas. These ions, which include cations or anions attached to solvent or solute species which are not themselves ions, are suitable for analysis by a mass spectrometer.

Xue et al. (supra) reported that a stable electrospray could be generated directly from a multichannel microfluid chip channel outlet port which opened at the flat edge of the microfluid chip. The voltage for electrospray ionization was applied from a buffer reservoir at the sample side with the mass spectrometer orifice grounded. Xue et al. reported that, because the electrospray plume was unstable when there was insufficient liquid flow at the channel outlet port, a syringe pump was required to provide adequate liquid flow.

Ramsey and Ramsey (supra) reported that a stable electrospray could be generated directly from a channel outlet port which ended in an opening at the flat edge of a microfluid chip using electroosmotic pumping. Ramsey and Ramsey obtained a mass spectrum from a 10 $\mu$M solution of tetrabutylammonium iodide, reportedly consuming 30 fmol of sample.

The results reported by Xue et al. and Ramsey and Ramsey suggest that electrospray directly from the outlet port of a microfluid chip has relatively poor sensitivity compared to that required for the analysis of minute quantities of biological macromolecules.

The poor sensitivity of the Ramsey and Ramsey and Xue et al. flow cells is likely caused by a number of factors. First, because the outlet port is in a flat edge of the microfluid chip, ionization of droplets leaving the chip causes the spray to spread out prior to entering the injection port. Second, because the edge cut channel is very large, a stable electrospray does not form efficiently, resulting in inefficient ionization. In addition, the Xue et al. flow cell requires a pump to generate a driving force and the Ramsey and Ramsey flow cell requires a side-arm channel to generate a driving force. These features reduce sensitivity and make it difficult to conduct high throughput analysis of minute samples.

SUMMARY OF THE INVENTION

The invention features an improved interface between a microfluid chip and a mass spectrometer. It has been found that by connecting a very fine tube (or "interface tip") to an outlet port of a microfluid chip, the sensitivity of the mass spectroscopy analysis of materials exiting the outlet port of a microfluid chip is greatly enhanced. The proximal end of the interface tip, which can be made of glass, quartz, fused silica or other suitable material, can be adhesively bonded or friction fitted to the outlet port of the microfluid chip. Alternatively, the tip may be produced as a integral part of the microfluid chip. The distal end of the interface tip preferably has an inside diameter of 0.5–15 $\mu$m, more preferably from about 0.5 $\mu$m to about 5 $\mu$m. The inside diameter of the tip at its proximal end is sized to be in fluid communication with the microfluid chip outlet port to which it is attached. The interface tip has a conductive coating of Au, Pt, or other suitable conductive material on its outer surface.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, the preferred methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF THE PREFERRED EMBODIMENTS

Figure 1:
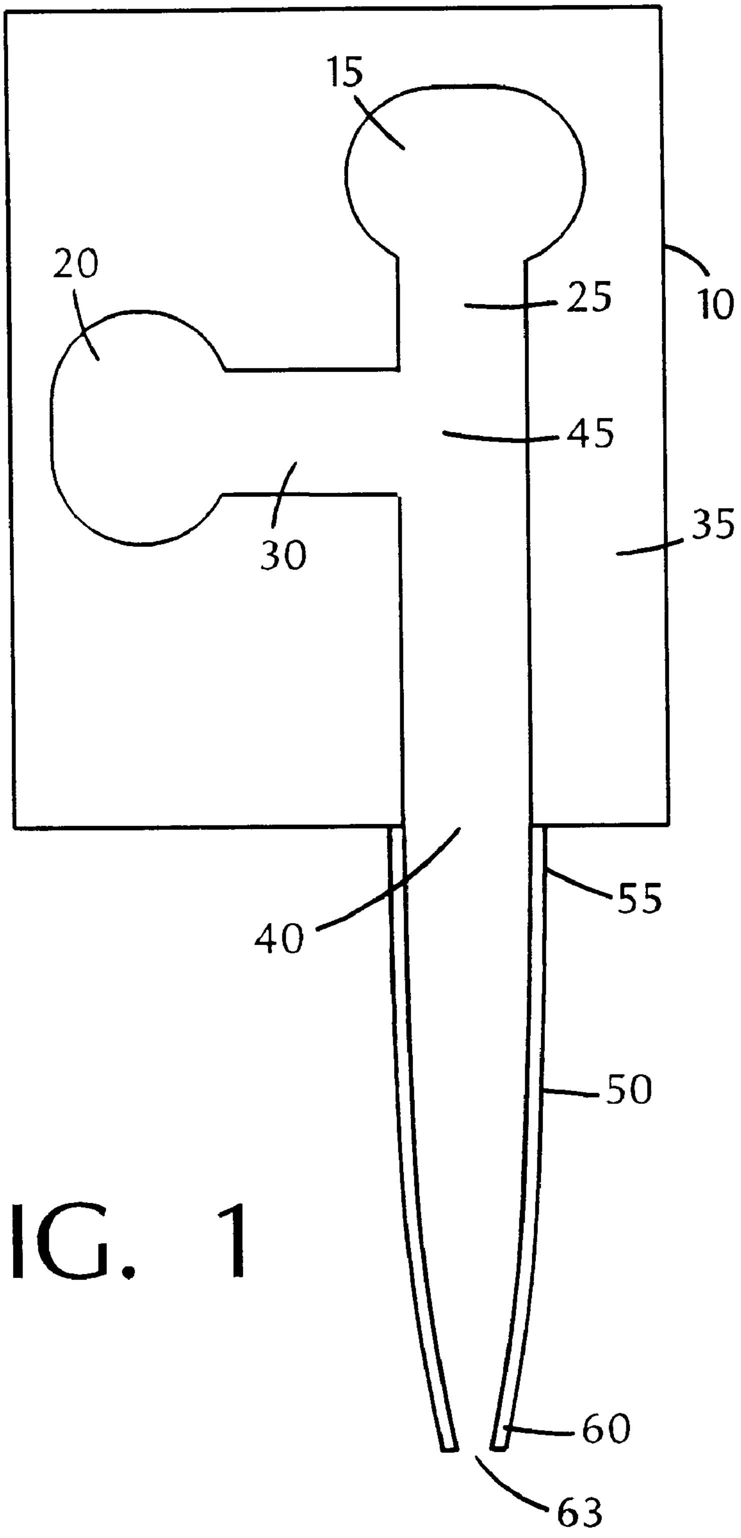
FIG. 1 is a schematic, top view of a microfluid chip attached to a mass spectrometry interface tip according to a preferred embodiment of the invention.

Shown in FIG. 1 is a schematic, top view of a microfluid chip attached to a mass spectrometry interface tip according to one embodiment of the invention. The microfluid chip 10 comprises two reservoirs 15 and 20 on base member 35. It also comprises two channels 25 and 30 micromachined into a base member 35. Reservoir 20 is a sample introduction reservoir. Reservoir 15 is a driving reservoir and is in fluid communication with channel 25 which has an outlet 40 at its distal end. Reservoir 20 is in fluid communication with channel 30 which intersects channel 25 at intersection 45.

An interface tip 50, having a proximal end 55 and a distal end 60, is attached to microfluid chip 10 at outlet 40 such that interface tip 50 is in fluid communication with channel 25. Interface tip 50 has opening 63 at its distal end.

The distal end of the interface tip has a small inside diameter, preferably from about 1 μm to about 15 μm, more preferably from about 0.5 μm to about 5 μm. This permits the use of very low flow rates and minimizes the amount of sample consumed.

The interface tip can be formed of glass, quartz, fused silica, or other suitable material and has a conductive coating of Au, Pt, or other suitable conductive material on its outer surface. Suitable tips are available from New Objective, Inc. (Cambridge, Mass.). Depending on the user's requirements, suitable interface tips include those sized to accommodate flow rates from 0.1 nl/min up to 500 nl/min. Generally, the lower the flow rate, the higher the sensitivity. Generally, the smaller the inside diameter of the interface tip at its distal end, the lower the flow rate. A wall thickness at the distal end of less than 100 nm, preferably less than 50 nm, is desirable for generating electrical fields which are high enough to carry out stable electrospray ionization.

The conductive coating on the interface tip can cover the entire length of the interface tip or be restricted to the distal end of the tip. By coating only the distal end of the interface tip, the interface tip will have an optically clear narrow channel proximal to the exit end of the interface tip. In such a configuration, an optical detector, such as a spectrophotometer, can be used to analyze the sample in the interface tip prior to electrospray by using the non-coated area of the interface tip as a detection window. For example, a UV spectrometer can be used to measure nucleic acid content prior to injection into the mass spectrophotometer. Existing flow cells cannot be used in this manner, primarily due to the size of the flow channel. The overall length of the tip is generally less than 5 cm, preferably from about 0.2 cm to about 1.5 cm, more preferably from about 0.5 cm to about 1 cm. However, this length can be varied to accommodate the needs of the user.

Valaskovic et al. (*Anal. Chem.* 67:3802, 1995) describes electrospray tips having an inside diameter at the distal end of 2–6 μm and methods for preparing such tips. These tips can be adapted for use in the present invention. To produce such tips small bore (e.g., 5, 10, 15, or 20 μm inside diameter; 150 μm outside diameter) fused silica capillary tubing (Polmico Technologies; Phoenix, Ariz.) is mounted on a micropipet puller. A laser, e.g., a 25 W $CO_2$ laser is used to burn off any coating on the tubing (11 W for 5–15 sec) and soften the silica (16 W) . The puller is used to reduce the tubing diameter to yield a short (approximately <1 mm) taper, separating the tube into two 50–100 nm inner diameter tubes. The pulled ends are cleaved and trimmed back for 1–4 cm. The tips are immersed in 49% HF (Fisher Chemicals; Fairlawn, N.J.) for 30–60 sec and then flushed with purified water. The tips are coated with a 25–150 nm thick gold film using a thin-film sputter deposition system (Denton Vacuum, Model DV-502; Cherry Hill, N.J.) in a 60 mtorr argon atmosphere with a 20 mA sputter current. Valaskovic et al. (*Appl. Opt.* 34:1215, 1995) provides further details regarding apparatus useful for the preparation of interface tips.

Electrospray tips having a larger inside diameter, e.g., 5–250 μm, are described by Gale et al. (*Rapid Commun. Mass Spectrom.*, 7:1017, 1993), Emmett and Caprioli (*J. Am. Soc. Mass Spectrom.* 5:605, 1994), and Karger et al. (*Anal. Chem.* 67:385, 1995). These tips can be adapted for use in the present invention.

Microfluid chips can be produced by any standard process for producing such chips, for example, the processes described by Xue et al. (supra); Ramsey (WO 96/04547); Swedberg et al. (U.S. Pat. No. 5,571,410) or Ekstrom et al. (U.S. Pat. No. 5,376,252).

For example, the base member of the microfluid chip can be a microscope slide. Glass is a preferred material, but fused silica, crystalline quartz, fused quartz, plastics, and the like are also suitable. The channel pattern is formed in a planar surface of the substrate using standard photolithographic procedures followed by chemical wet etching. The channel pattern can be transferred onto the substrate with a positive photoresist (e.g., Shipley 1811) and an e-beam written chrome mask. The pattern is then chemically etched with an $HF/NH_4F$ solution. After channel forming, a cover plate, having openings for fluid communication with any reservoirs, is bonded to the substrate using a direct bonding technique as follows. The surfaces are first hydrolyzed in a dilute $NH_4OH/HO$ solution and joined. To assure proper adhesion, the assembled pieces are annealed at about 500° C.

Next, the reservoirs are affixed to the substrate at the openings in the cover plate using epoxy or other suitable means. The reservoirs can be cylinders with open ends. Electrical contact to the reservoirs is made by placing a platinum wire electrode in each reservoir.

Figure 2:
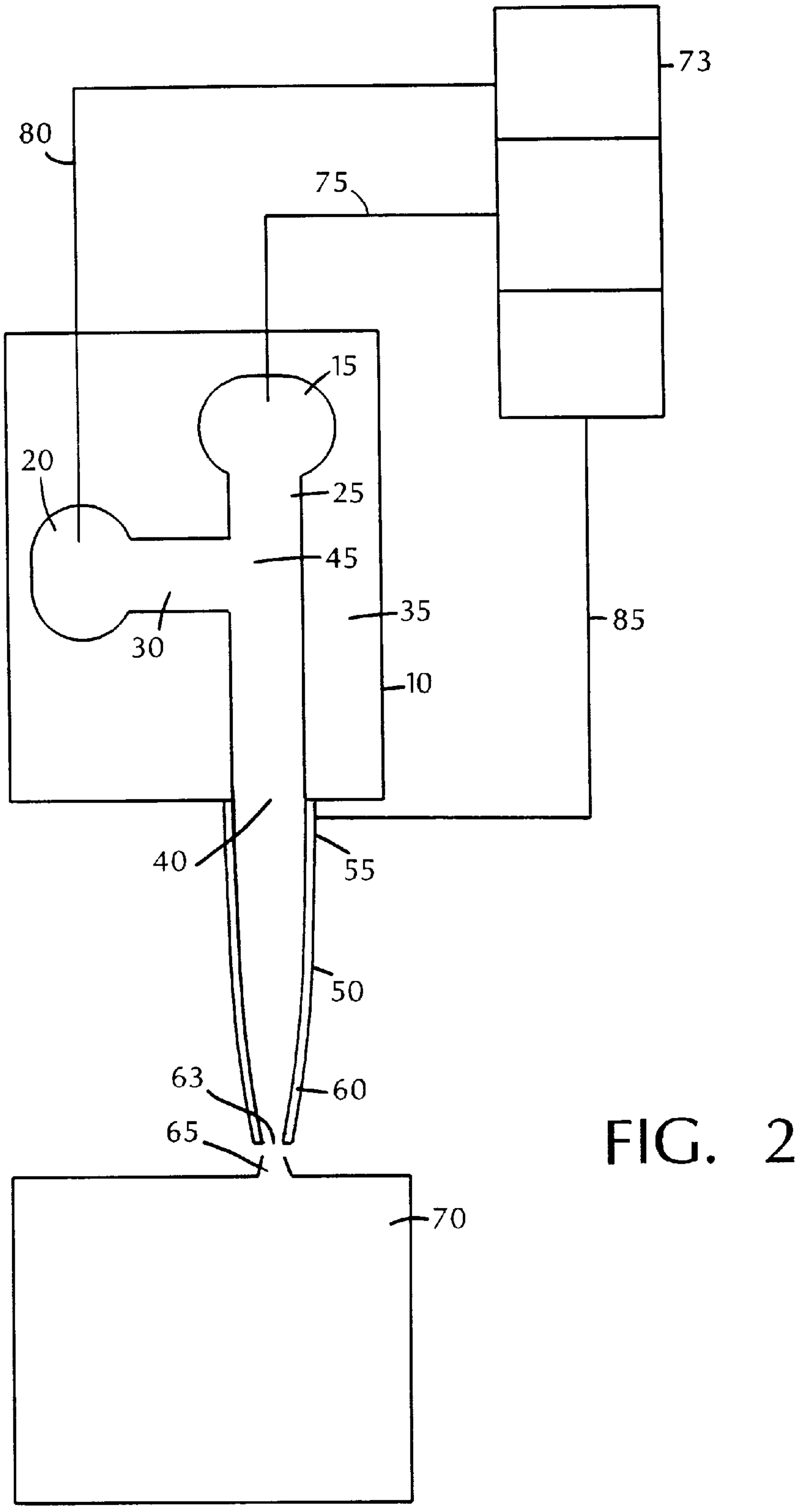
FIG. 2 is a schematic drawing of a microfluid chip attached to a mass spectrometry interface tip and interfaced with a mass spectrometer.

To carry out electrospray ionization mass spectrometry, a microfluid chip having an attached interface tip is positioned such that the distal end of the interface tip is placed a few millimeters (e.g., 1–4 mm) from the mass spectrometer skimmer. Thus, referring to FIG. 2, microfluid chip 10, having an interface tip 50 is positioned such that the interface tip is aligned with the skimmer 65 of mass spectrometer 70. A sample is introduced into sample introduction reservoir 20 using a suitable sampling device, e.g., a micropipet or a syringe. To carry out electrospray ionization, a high voltage, low current power supply 73 is used to apply a voltage, e.g., 4–5 KV, via driving reservoir electrode 75 inserted in driving reservoir 15 while sample introduction reservoir 20 is held at a lower voltage than driving reservoir 15 via a sample introduction reservoir electrode 80 inserted in sample introduction reservoir 20. For example, when driving reservoir 15 is held at 5 KV, sample introduction reservoir 20 is typically held at 1–2KV. This drives the sample from sample introduction reservoir 20 through channel 30 and channel 25 towards driving reservoir 15. Next, the power to sample introduction reservoir 20 is turned off while driving reservoir 15 is held a 5 KV and interface tip 50 is held at a lower voltage than driving reservoir 15 via electrode 85 affixed to interface tip 50. For example, if driving reservoir 15 is held a 5 KV, the interface tip 50 is held at 1–2 KV or ground. This drives the sample through channel 25 towards outlet 40, through interface tip 50, exiting opening 63. As the sample exits opening 63 it forms an electrospray. The electrospray enters the skimmer 65 of mass spectrometer 70, permitting analysis of the sample.

It will be understood that the system described above can be modified in many ways. For example, for high throughput analysis, a robotic sampling device can be used to deliver samples to sample introduction reservoir 20, either directly or by means of an electrical potential which drives samples from reservoirs that are not on the microfluid chip to sample introduction reservoir 20. In addition, the microfluid chip may include additional reservoirs and channels which can be used modify the sample (e.g., by chemical or enzymatic reactions taking place within a reservoir or channel), purify the sample (e.g., through interaction between the sample and antibodies or chromatographic material coating the inner surface of a channel), or add additional components to the sample (e.g., a solvent).

What is claimed is:

1. An improved microfluid chip to mass spectrometer interface, said interface improvement comprising a tube attached to an outlet port of microfluid chip, said tube having a distal end and a proximal end, said proximal end of said tube being attached to said outlet port, and said tube having an inside diameter of less than about 50 μm.

2. The improved microfluid chip to mass spectrometer interface of claim 1, wherein said distal end of said tube has a smaller inside diameter than the inside diameter of said proximal end of said tube.

3. The improved microfluid chip to mass spectrometer interface of claim 1, wherein said proximal end of said tube has an inside diameter of between about 20 μm to about 50 μm, and said distal end of said tube has a inside diameter of between about 1 μm to about 15 μm.

4. The improved microfluid chip to mass spectrometer interface of claim 1, wherein said tube is made of fused silica or glass.

5. The improved microfluid chip to mass spectrometer interface of claim 2, wherein said tube is made of fused silica or glass.

6. The improved microfluid chip to mass spectrometer interface of claim 3, wherein said tube is made of fused silica or glass.

7. The improved microfluid chip to mass spectrometer interface of claim 4, wherein said tube is coated with a conductive material.

8. The improved microfluid chip to mass spectrometer interface of claim 5, wherein said tube is coated with a conductive material.

9. The improved microfluid chip to mass spectrometer interface of claim 6, wherein said tube is coated with a conductive material.

10. The improved microfluid chip to mass spectrometer interface of claim 1, wherein said tube is attached to said outlet port via an adhesive.

11. The improved microfluid chip to mass spectrometer interface of claim 2, wherein said tube is attached to said outlet port via an adhesive.

12. The improved microfluid chip to mass spectrometer interface of claim 3, wherein said tube is attached to said outlet port via an adhesive.

13. The improved microfluid chip to mass spectrometer interface of claim 4, wherein said tube is attached to said outlet port via an adhesive.

14. The improved microfluid chip to mass spectrometer interface of claim 5, wherein said tube is attached to said outlet port via an adhesive.

15. The improved microfluid chip to mass spectrometer interface of claim 6, wherein said tube is attached to said outlet port via an adhesive.

16. The improved microfluid chip to mass spectrometer interface of claim 1, wherein said tube is attached to said outlet port via friction fit.

17. The improved microfluid chip to mass spectrometer interface of claim 2, wherein said tube is attached to said outlet port via a friction fit.

18. The improved microfluid chip to mass spectrometer interface of claim 3, wherein said tube is attached to said outlet port via a friction fit.

* * * * *